US011620474B2

(12) United States Patent
Challis et al.

(10) Patent No.: US 11,620,474 B2
(45) Date of Patent: *Apr. 4, 2023

(54) MODEL RESELECTION FOR ACCOMMODATING UNSATISFACTORY TRAINING DATA

(71) Applicant: ADOBE INC., San Jose, CA (US)

(72) Inventors: Christopher John Challis, Alpine, UT (US); Aishwarya Asesh, Salt Lake City, UT (US)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/480,280

(22) Filed: Sep. 21, 2021

(65) Prior Publication Data
US 2022/0004813 A1 Jan. 6, 2022

Related U.S. Application Data

(63) Continuation of application No. 16/417,245, filed on May 20, 2019, now Pat. No. 11,132,584.

(51) Int. Cl.
G06K 9/00 (2022.01)
G06K 9/62 (2022.01)
G06F 11/32 (2006.01)
G06F 11/00 (2006.01)

(52) U.S. Cl.
CPC .......... *G06K 9/6256* (2013.01); *G06F 11/004* (2013.01); *G06F 11/323* (2013.01); *G06F 2201/80* (2013.01); *G06F 2201/805* (2013.01)

(58) Field of Classification Search
CPC .............. G06K 9/6256; G06F 11/323; G06F 11/004; G06F 2201/805; G06F 2201/80; G06F 11/3006; G06F 11/302

USPC ......................................................... 382/159
See application file for complete search history.

(56) References Cited

U.S. PATENT DOCUMENTS

| 8,554,703 | B1* | 10/2013 | Lin | G06N 20/00 |
| | | | | 706/12 |
| 2010/0138277 | A1* | 6/2010 | Au | G06Q 30/02 |
| | | | | 705/7.29 |
| 2016/0132775 | A1* | 5/2016 | Baughman | G06N 5/02 |
| | | | | 706/58 |
| 2018/0060744 | A1* | 3/2018 | Achin | G06N 5/04 |

(Continued)

OTHER PUBLICATIONS

Dickey, A., D., and Fuller, A., W., "Distribution of the estimators for autoregressive lime series with a unit root.", Journal of the American Statistical Association, vol. 74, issue. 366, pp. 427-431 (Jun. 1979).

*Primary Examiner* — Van D Huynh
(74) *Attorney, Agent, or Firm* — Shook, Hardy & Bacon L.L.P.

(57) ABSTRACT

An anomaly analysis system generates models capable of more accurately identifying anomalies in data that contains unsatisfactory training data. The anomaly analysis system determines when data contains unsatisfactory training data. When an anomaly is detected in data using an initially selected model, and the data contains unsatisfactory training data, model reselection is performed. The reselected model analyzes the data. The reselected model is used to identify any anomalies in the data based on a data point from the data being outside of a confidence interval related to a predicted point by the reselected model corresponding to the data point.

20 Claims, 10 Drawing Sheets

(56) References Cited

U.S. PATENT DOCUMENTS

| | | | |
|---|---|---|---|
| 2018/0234443 A1* | 8/2018 | Wolkov | G06F 21/552 |
| 2018/0349468 A1* | 12/2018 | Togawa | G06F 16/285 |
| 2019/0205531 A1* | 7/2019 | McMurdie | G06F 21/552 |
| 2019/0259499 A1* | 8/2019 | Hong | G16H 50/20 |
| 2019/0325328 A1* | 10/2019 | Katz | G06K 9/627 |
| 2020/0285997 A1* | 9/2020 | Bhattacharyya | G06N 20/00 |

\* cited by examiner

MODEL RESELECTION FOR ACCOMMODATING UNSATISFACTORY TRAINING DATA

CROSS-REFERENCE TO RELATED APPLICATION

This application is a Continuation of U.S. patent application Ser. No. 16/417,245 filed May 20, 2019 and titled "Model Reselection for Accommodating Unsatisfactory Training Data," the entire contents of which are incorporated by reference herein.

BACKGROUND

Oftentimes, business intelligence or analytics systems are computer-based systems that collect and analyze data related to customers. Such analytics systems can provide insight about customers, products, and/or business trends based on analyzed data. In this regard, analytics systems can analyze data in an attempt to identify or detect anomalies thereby facilitating separation of relevant signals from noise and enabling identification of which statistical values matter and which do not. It is important to accurately identify such anomalies in data to enhance insights (e.g., business insights) provided to users. For instance, detecting anomalies in data allows for identifying potential factors that contributed to the anomalies. However, oftentimes, using a model trained with unsatisfactory training data produces inaccurate or poor anomaly detection or prediction.

SUMMARY

Embodiments of the present disclosure are directed towards an improved anomaly analysis system that selects predictive models for anomaly detection or prediction irrespective of unsatisfactory training data. In this regard, a predictive model capable of more accurately detecting anomalies in data can be selected and utilized regardless of the training data used to generate the predictive model contained unsatisfactory training data. In accordance with embodiments of the present disclosure, the anomaly analysis system can obtain time series data for analysis. Such time series data can be indicated via a user request to analyze the time series data, or a portion thereof, for anomalies. The time series data, such as a training portion of the time series data, can be analyzed to determine whether the time series data includes unsatisfactory training data that can adversely impact the performance of a predictive model. In some instances, unsatisfactory training data can be indicated by a lack of stationarity of the time series data. Additionally or alternatively, unsatisfactory training data can be indicated by a predefined percentage of zeroes occurring in the training portion of the time series data (e.g., 10% of the data comprising the training portion).

In implementations, an initial model can be selected and executed using input data (e.g., a portion of the time series data set) to detect presence of anomalous data. When the analysis of data using the selected model indicates the presence of anomalies and there is an indication of unsatisfactory training data, model reselection can be performed. That is, a model can be reselected using a different model selection process. The reselected model can more accurately perform anomaly detection or otherwise analyze data when trained using unsatisfactory training data. The model can be reselected from a set of models using a lowest Mean Absolute Error ("MAE") score. Automatically reselecting a model when an anomaly is detected and insufficient training data is present can result in selecting a model that can more accurately identify anomalies.

DETAILED DESCRIPTION

Figure 1A:
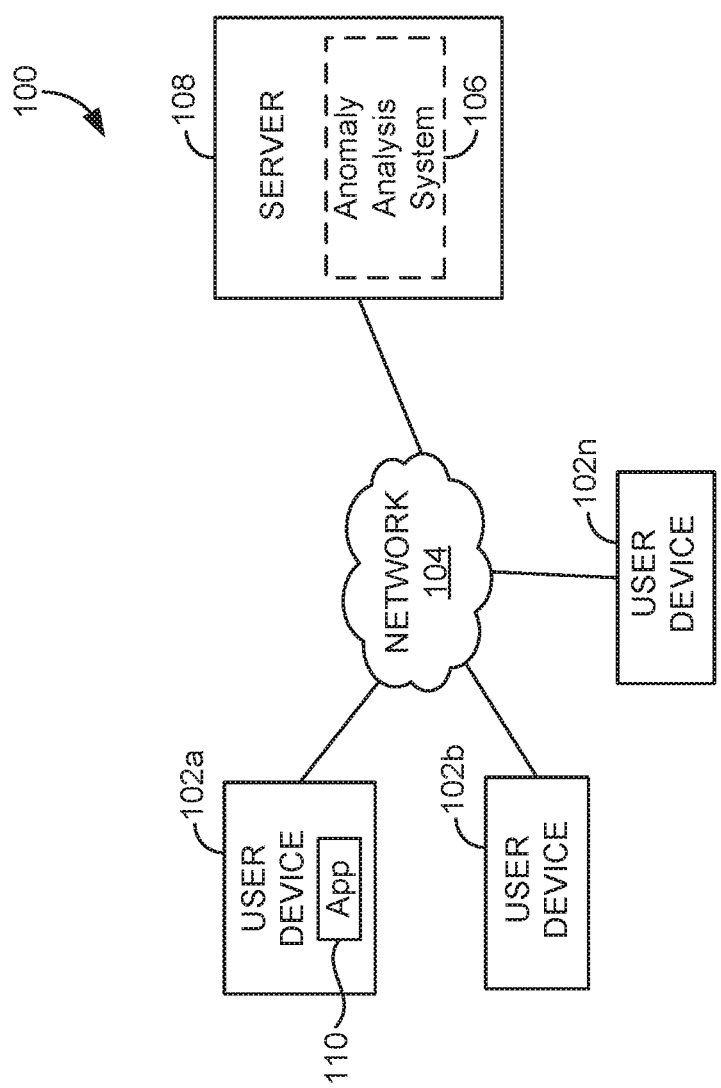
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A vast amount of data can be gathered for use in evaluating metrics, such as web metrics of a business (e.g., customer interactions with a webpage/website) or any other type of metrics (e.g., business metrics). Analytics systems typically process this vast amount of data to provide insight into a specified metric over a designated period of time (e.g., amount of daily visitors to a webpage during the month of March). Typically, an analytics system can detect or predict anomalies in data, such as time series data, via a machine learned model(s). For example, training data can be used to train a machine learned model, which is then used along with input data to predict data (e.g., a subsequent point in a series of data). The predicted data can then be compared to actual or observed data to detect anomalous data. As insights are gained from these anomalies, it is desirable to accurately detect data anomalies. For example, accurately detecting anomalies in data can allow for identifying potential factors or root causes that contributed to the occurrence of those anomalies (e.g., determining a detected anomaly in a day-to-day analysis of purchases corresponds to Black Friday).

Providing accurate predictions and anomaly detection, however, can be heavily dependent on the data used to train the model (e.g., the training data set). In this way, utilizing unsatisfactory training data to train a machine learned model to predict or output data for use in anomaly detection can oftentimes result in inaccurate anomaly detection.

Conventional methods used by existing analytics systems have tried to create models capable of accurately detecting anomalies from data. However, these conventional methods have had limited success in creating models that can accurately detect anomalies when the models are trained using unsatisfactory training data. In particular, when a model is created using conventional methods to identify an anomaly in data, the data is merely adjusted and the same model is retrained using the adjusted data. As such, existing analytics systems are generally deficient in providing accurate predictive models that can perform anomaly detection from a model trained using unsatisfactory training data.

Accordingly, embodiments of the present disclosure are directed to aspects of an improved analytics system (referred to herein as an anomaly analysis system) that enables model reselection when unsatisfactory training data is used to train an initially selected model. Enabling model reselection when unsatisfactory training data is identified can enable more accurate detection of anomalies in data. In particular, during model reselection a model selection method can be used that is less sensitive to outliers in data. Using this model selection can identify a reselection model that can more accurately detect anomalies in data.

At a high level, the anomaly analysis system can determine when a data set, such as a time series data set, contains unsatisfactory training data. Upon detecting anomalous data using an initially selected model, the anomaly analysis system can apply model reselection when the training data used to train the selected model includes unsatisfactory training data. Advantageously, reselecting a model can result in generating a model that more accurately identifies anomalies in unsatisfactory training data.

In operation, the anomaly analysis system can receive a request to analyze data. Such a request to analyze data can be received from a user (e.g., a user of the improved analytics system). Data to analyze can relate to a metric (e.g., where data comprises collected values). The data, such as time series data, can be analyzed to determine if the data contains an indication of unsatisfactory training data. In some instances, unsatisfactory training data can be indicated based on stationarity of the time series data (e.g., a lack of stationarity). Alternatively or additionally, unsatisfactory training data can be indicated by a predefined percentage of zeroes occurring in the training portion of the time series data (e.g., 5%, 8%, 10% of the data comprising the training portion). When data contains an indication of unsatisfactory training data, a reselection flag can be triggered.

To identify anomalies in data, a model can be selected for analyzing the data. The model can be a model for time series forecasting. Such a time series forecasting model can be characterized based on three dimensions: error, trend, and seasonality. Error can be additive or multiplicative. An additive error model defines error as difference(s) between predicted data and observed data, while multiplicative error model defines error as the ratio between predicted data and observed data. Trend can generally refer to a general pattern in the time series over the course of the series (e.g., increase or decrease). Seasonality can generally refer to patterns in time series data that occur at regular intervals (e.g., season of the year, days of the week, times of a day). Error, trend, and seasonality can be varied to create different time series forecasting models. An ANA model can use a combination of additive error, no trend, and additive seasonality. An AAA model can use a combination of additive error, additive trend, and additive seasonality. A MNM model can use a combination of multiplicative error, no trend, and multiplicative seasonality. An AAN model can use a combination of use additive error, additive trend, and no seasonality. A MNA model can use a combination of multiplicative error, no trend, and additive seasonality. Initially, a model can be selected from the set of models using a lowest Mean Absolute Percent Error ("MAPE") score. In embodiments, when an analysis of data using a selected model indicates the presence of an anomaly(s) and there is no indication of unsatisfactory training data, re-estimation can be performed using the selected model. Re-estimation can adjust the data used to train the selected model to remove known outliers before retraining the model. Re-estimation can include, for example, taking into account known customer and/or business cycles (e.g., holidays).

On the other hand, when an analysis of data using a selected model indicates the presence of an anomaly and there is an indication of unsatisfactory training data (e.g., a reselection flag or other indicator), model reselection can be performed. Reselection can include selecting a new or different model to use for analyzing the data. Model reselection can occur from a set of models using a lowest Mean Absolute Error ("MAE") score. In embodiments, the model can be reselected from the additive models (e.g., ANA, AAA, and AAN). Advantageously, reselecting a model can result in selecting a model that more accurately identifies anomalies data. Selecting a model using MAE is advantageous because MAE can scale forecasting errors. In particular, using a MAE is less sensitive to outlies in the training data.

Various terms and phrases are used herein to describe embodiments of the present invention. Some of the terms and phrases used herein are described here, but more details are included throughout the description.

As used herein, the term "time series data" refers a sequence of data taken at successive (e.g., equally spaced) points in time. For instance, time series data may include a sequence of data indicative of user interactions with a website and/or webpage. In instances, time series data can be analyzed to extract meaningful statistics and/or characteristic related to the data. A training portion of time series data can be used as training data to train a predictive model related to the data. Such a model can predict a next point in the series using another portion of the time series data that is input into the predictive model (e.g., predict future values based on previously observed values).

The term "confidence interval" is used herein to refer to a level of confidence in a prediction. As an example, when a model trained using obtained time series data predicts a next data point as five with a confidence interval of plus or minus one (e.g., in relation to a predicted point), the confidence interval for the predicted point can be four to six.

The term "anomaly" is used herein to refer to an outlier from the normal trends of the data. When an observed point (e.g., data point from the time series data) is outside of the confidence intervals of a predicted point, the outside point can be designated as an anomaly. Accurately detecting anomalies in data can allow for identifying potential factors that contributed to the occurrence of those anomalies (e.g., a detected anomaly in a day-to-day analysis of purchases corresponds to Black Friday). In other words, accurately detecting anomalies allows for identification of significant statistical fluctuations that can be used to determine a root cause of the anomaly.

The term "unsatisfactory training data" is used herein to refer to training data that is insufficient or not ideal for training a predictive model. In embodiments, unsatisfactory training data includes data insufficient to enable accurate identification of anomalies in data. In some instances, unsatisfactory training data can be indicated by stationarity of the time series data. In further instances, unsatisfactory training data can be indicated by a predefined percentage of zeroes occurring in the training portion of the time series data (e.g., 10% of the data comprising the training portion). When data contains an indication of unsatisfactory training data, a reselection flag can be triggered to indicate model reselection when appropriate (e.g., when data anomalies are detected).

The term "reselection" is used herein to refer to model reselection. Reselection or model reselection can include selecting a model to use for analyzing the data using a different model selection process. The model selection process used during reselection can scale errors in model predictions and is less sensitive to outlier data during training In embodiments, reselection can occur when data contains unsatisfactory training data. For example, in instances, model reselection can be triggered when data corresponds with a reselection flag and an anomaly is identified using a selected model. A reselected model can generally refer to a model that is selected during model reselection. The reselected model can be a new, different, or the same model selected using the different model selection process.

The term "stationarity" is used herein to refer to time series data with statistical properties (e.g., mean, variance, autocorrelation, etc.) that are relatively constant over time. Stationarity can further be indicative that the time series data follows a consistent trend (e.g., is highly predictive). In embodiments, determining stationarity can be performed using, for example, the Augmented Dicky-Fuller test ("ADF").

The term "granularity" is used herein to refer to a level at which data is to be analyzed. For instance, granularity can be used to characterize the scale of analysis applied to time series data. As an example, granularity can be monthly, weekly, daily, and/or hourly.

Turning now to FIG. 1A, an example configuration of an operating environment is depicted in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 for identifying anomalies in data. In some implementations, the application(s) comprises a web application, which can run in a web browser, and could be hosted at least partially on the server-side of environment 100. In addition, or instead, the application(s) can comprise a dedicated application, such as an application having data analytics functionality. In some cases, the application is integrated into the operating system (e.g., as a service). It is therefore contemplated herein that "application" be interpreted broadly.

In accordance with embodiments herein, the application 110 facilitates identifying anomalies in data. In accordance with identifying anomalies in data, more accurate insights (e.g., business insights) can be provided to a user. Further, in some cases, a root cause(s) of the anomaly may be identified (e.g., by identifying potential factors that contributed to an anomaly). In some implementations, data for analysis can be selected, for instance, by a user of application 110. A "user" can be a marketer, publisher, editor, author, data scientist, or other person who employs the anomaly analysis system to analyze data to detect and/or interpret anomalies in the data. Results (e.g., detected anomalies) determined via the anomaly analysis system 106 can be output to a user, for example, via the user device 102a. Such results can be used in analyzing data related to a metric (e.g., a web metric).

As described herein, server 108 generally facilitates identifying anomalies in data via anomaly analysis system 106. As an example, anomaly analysis system 106 may be associated with ADOBE ANALYSIS WORKSPACE. The anomaly analysis system can determine when a data set contains anomalies. For instance, the anomaly analysis system can obtain time series data for analysis. Such time series data can be indicated via a user request to analyze the time series data, or portion thereof, for anomalies. The time series data can be analyzed to determine whether the time series data includes unsatisfactory training data that can adversely impact the performance of a predictive model. In some instances, unsatisfactory training data can be indicated by a lack of stationarity of the time series data. Additionally or alternatively, unsatisfactory training data can be indicated by a predefined percentage of zeroes occurring in the training portion of the time series data (e.g., 10% of the data comprising the training portion). A set of predictive model can be trained and evaluated using training data and input data (e.g., a portion of the time series data set). The best predictive model can be selected from the set based on minimal error. For instance, the model can be reselected from a set of models using a lowest Mean Absolute Percent Error ("MAPE") score. The selected model can be run using input data (e.g., a portion of the time series data set) to detect presence of anomalous data. When the analysis of data using the selected model indicates the presence of anomalies and there is an indication of unsatisfactory training data, model reselection can be performed, that is, a model can be reselected using a different selection method. The model can be reselected from a set of models using a lowest Mean Absolute Error ("MAE") score. Automatically reselecting a model when an anomaly is detected and insufficient training data is identified can select a model that can more accurately identify anomalies.

Server 108 includes one or more processors, and one or more computer-readable media. The computer-readable media includes computer-readable instructions executable by the one or more processors. The instructions may optionally implement one or more components of anomaly analysis system 106, described in additional detail below.

For cloud-based implementations, the instructions on server 108 may implement one or more components of anomaly analysis system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of anomaly analysis system 106 may be implemented completely on a user device, such as user device 102a. In this case, anomaly analysis system 106 may be embodied at least partially by the instructions corresponding to application 110.

Figure 1B:
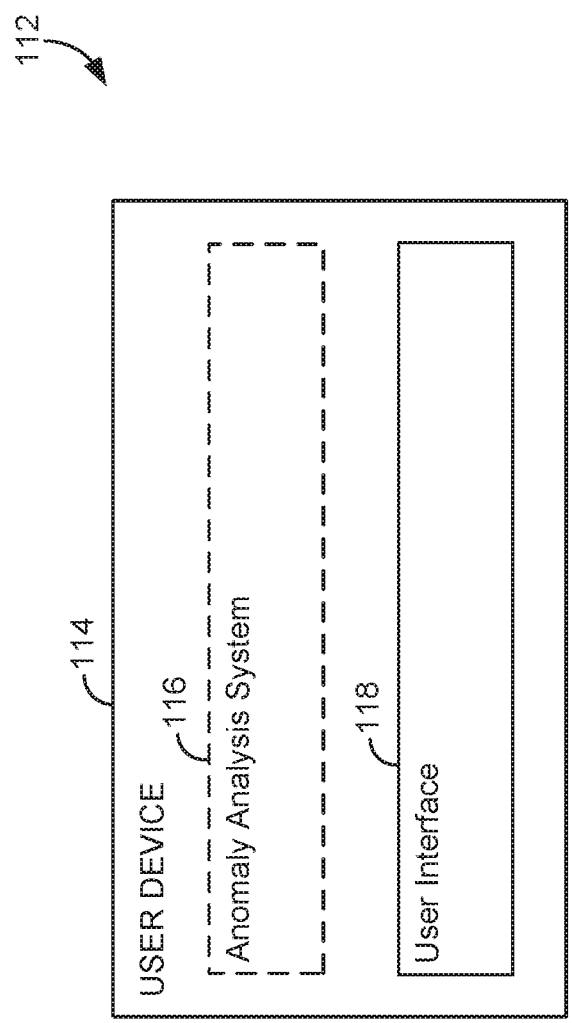
FIG. 1B depicts an example configuration of another operating environment in which some implementations of the present disclosure can be employed, in accordance with various embodiments.

Referring to FIG. 1B, aspects of an illustrative anomaly analysis system are shown, in accordance with various embodiments of the present disclosure. FIG. 1B depicts a user device 114, in accordance with an example embodiment, configured to allow for anomaly analysis system 116 to identify anomalies in data. The user device 114 may be the same or similar to the user device 102a-102n and may be configured to support the anomaly analysis system 116 (as a standalone or networked device). For example, the user device 114 may store and execute software/instructions to facilitate interactions between a user and the anomaly analysis system 116 via the user interface 118 of the user device.

Figure 2:
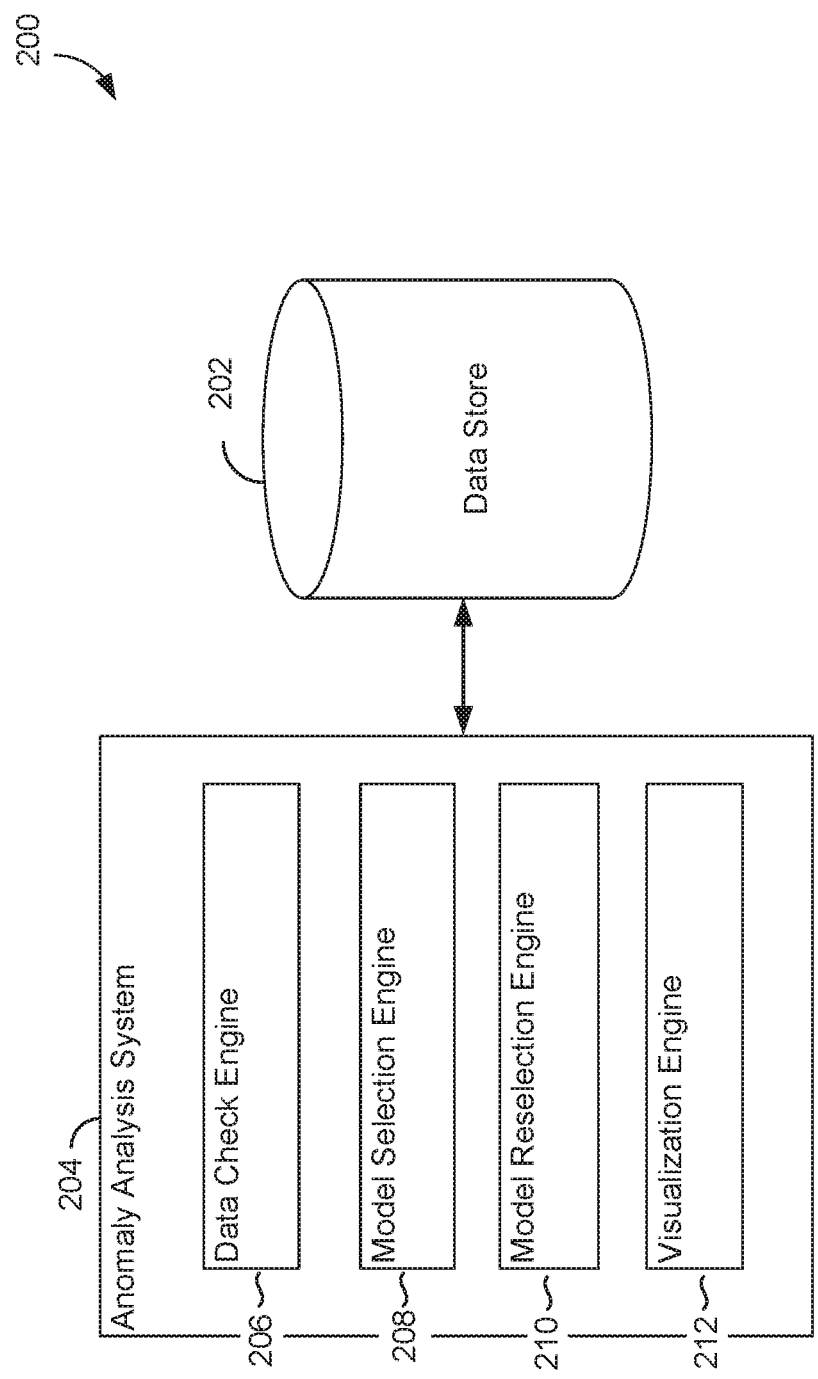
FIG. 2 depicts an example configuration of an operating environment in which some implementations of the present disclosure can be employed, in accordance with various embodiments.

FIG. 2 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8. It should be understood that operating environment 200 shown in FIG. 2 is an example of one suitable operating environment. Among other components not shown, operating environment 200 includes a number of user devices, networks, and server(s).

As depicted, anomaly analysis system 204 includes data check engine 206, model selection engine 208, model reselection engine 210, and visualization engine 212. The foregoing engines of anomaly analysis system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the anomaly analysis system.

As shown, anomaly analysis system 204 operates in conjunction with data store 202. Data store 202 stores computer instructions (e.g., software program instructions, routines, or services), data, and/or models used in embodiments described herein. In some implementations, data store 202 stores information or data received via the various engines and/or components of anomaly analysis system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

Data stored in data store 202 can include data (e.g., training data, input data, predicted data) and/or machine learned models. Training data generally refers to data used to train machine learned models. By way of example, training data may include a portion of a time series data set. Input data generally refers to data input to a machine learned model for use in predicting data. In some embodiments, input data may include another portion (distinct from the training data) of a time series data set. Predicted data generally refers to output or data predicted from a machine learned model. It is contemplated that machine learned model(s) can be used to determine anomalies in data. For instance, machine learning processes can be used to evaluate time series data to build a model capable of accurately predicting next or subsequent data points. Such data predicted via a machine learned model can be used to detect anomalies (e.g., by comparing the predicted data to actual data).

As described, data utilized herein for anomaly analysis (e.g., training data and/or input data) can be time series data. Time series data (e.g., stored in data store 202) generally refers to a sequence of data taken or observed at successive (e.g., equally spaced) points in time. Upon obtaining time series data, a portion of time series data can be used as training data to train a predictive model related to the data. Such a model can predict a next point in the series (e.g., predict future values based on the previously observed values in the training portion).

Anomaly analysis system 204 can be used to create more accurate models capable of identifying anomalies in data. At a high-level, training data can be used to train a set of predictive models (e.g., a machine learned model). From the trained predictive models, a best model can be selected based on errors between predicted values and observed values. When the selected model indicates an anomaly in the observed values (e.g., an observed value is outside a predefined range of deviation from a predicted data point that the point where the observed value occurred), model reselection can be performed. In particular, the anomaly analysis system can perform model reselection to determine a more accurate predictive model when unsatisfactory training data was used to train the selected model. For instance, such a system can leverage identified unsatisfactory training data to initiate reselection of a predictive model that that can better predict values when trained using unsatisfactory training data. In this way, the system is capable of handling the problem of unsatisfactory training data to select a best estimating model capable of accurately detecting anomalies in data.

Data check engine 206 of the anomaly analysis system is generally configured to identify, detect, or determine unsatisfactory training data, or an existence thereof, within a set of training data used to train a machine learned model (e.g., a predictive model). As described, unsatisfactory training data refers to training data that is not ideal for training a predictive model to accurately identify anomalies in data.

Initially, in embodiments, the data check engine 206 can obtain data or data set (e.g., training data) for analysis. Data can be obtained in any number of ways. As one example, data can be obtained (e.g., from data store 202) based on an indication from a user. For instance, a request for performing anomaly detection can define data (e.g., a data set) for analysis. A request can be received for a defined data set that is to be used to train and then run a predictive model. For instance, a request may include a defined data set including a first portion used as training data to train a machine learned model(s) and a second portion used to run or execute a machine learned model(s).

In an embodiment, the data can be retrieved from data store 202. In other embodiments, the data can be retrieved from a server, or other component, that stores a collected or observed data. Data obtained for analysis may be time series data, which generally refers to a sequence of data taken or observed at successive (e.g., equally spaced) points in time. For instance, time series data can represent a sequence of data indicative of user interactions with a website and/or webpage.

In addition to obtaining data or a data set for analysis, the data check engine 206 can identify a granularity or granularity level at which to analyze the data. For instance, granularity can be the level of detail considered in a predictive model. In this regard, granularity can be used to characterize the scale of analysis applied to a data set (e.g., time series data). As an example, a granularity level can represent data analysis via a monthly, weekly, daily, and/or hourly basis. As described herein, granularity can be used to determine what type of model can be used to analyze the time series data. For instance, based on the granularity, different models can be used to analyze the data set. For example, time series forecasting model can be used as predictive models when the granularity of the time series data is daily or hourly. In particular, when the granularity of the time series data is daily or hourly, the predictive models of the anomaly analysis system can be used to detect anomalies in the time data series. In some instances, granularity can be designated in a request for anomaly detection on a defined data set. For example, in addition to including an indication of a desired data set to be analyzed, an anomaly detection request (e.g., input via a user) may include an indication of a granularity level at which to analyze the data. In other cases, granularity may be designated in other manners. For example, a data set (e.g., time series data set) may include an indication of granularity.

Upon obtaining data, such as training data, the data check engine 206 can analyze the obtained data, or portion thereof, to determine if the data contains unsatisfactory training data. In some instances, unsatisfactory training data can be indicated by a lack of stationarity of data (e.g., time series data). Stationarity, or data stationarity, can generally refers to data, such as time series data, with statistical properties (e.g., mean, variance, autocorrelation, etc.) that are relatively constant over time. Stationarity can indicative that the data follows a consistent trend (e.g., is highly predictive). Additionally or alternatively, unsatisfactory training data can be indicated by zero-value data. Zero-value data generally refers to data (e.g., training data) having a predefined percentage of zeroes. For instance, zero-value data may include a predefined percentage of zeroes occurring in the training portion of the time series data (e.g., 10% of the data comprising the training portion). When the training portion includes a predefined percentage of zeroes, there can be a limited about of training data with non-zero values that can be used to train an accurate model (e.g., a small amount of useful training data).

Determining stationarity can be performed using, for example, the Augmented Dicky-Fuller test ("ADF"). The ADF test can determine how strongly a time series data set (e.g., training data) is defined by a trend. In instances, the ADF test uses a null hypothesis that the time series can be represented by a unit root (e.g., that the time series is not stationary). For example, when the null hypothesis (e.g., H0), is failed to be rejected, then the result of the ADF test suggests the time series has a unit root, indicating the data is non-stationary. The alternative hypothesis (e.g., rejecting the null hypothesis) can be that the time series is stationary. For example, when the alternative hypothesis (e.g., H1) occurs the null hypothesis is rejected and the result of the ADF test suggests that the time series does not have a unit root, indicating the data is stationary. An outcome of the ADF test can be indicated using a p-value from the test. A p-value below a predefined threshold (e.g., 5%, 10%, etc.) can suggest that the null hypothesis is rejected (i.e., indicating the time series is stationary). A p-value above the predefined threshold can suggest that the null hypothesis is not rejected (i.e., indicating the time series is not stationary). As an example, p-value>0.10 results in failing to reject the null hypothesis (H0), and the data has a unit root and is non-stationary; p-value<=0.10 results in rejecting the null hypothesis (H0), and the data does not have a unit root and is stationary.

As described, zero-value data, or a predefined percentage of zeros occurring in a training portion of the time series data (e.g., 10% of the data comprising the training portion), can also indicate unsatisfactory training data. In this regard, training data can be analyzed to determine a percentage of zero values. Data points with a zero value can indicate a lack of an event. As such, in some instances, when zero values comprise a certain percentage of training data, this indicates a potential lack of enough information to train a model capable of accurate predictions. As an example, if creating a model to predict webpage interactions for a period of time (e.g., a day) using time series data collected over two weeks and there are no webpage predictions for day three, day four, or day five (e.g., where the training portion is taken from days one to five), then the data can be designated as unsatisfactory training data. In particular, in such an example, because the training data (e.g. days one to five) contains a large percentage of zeros—from the lack of webpage visits on days three to five—then there is not enough information in the training data to make accurate predictions (e.g., daily webpage interactions).

In accordance with determining a percent of zero-value data within the training data (e.g., portion of a time series data set), the percent of zero-value data can be compared to a predetermined threshold value (e.g., 20%) to determine if the training data includes zero-value data indicating unsatisfactory training data. A predetermined threshold value may be defined in any number of ways, such as via input provided from a user, or a computer-determined value. Further, although generally discussed as a percent of zero-value data, as can be appreciated, other measures may be used, such as a total number of zero-value data, or the like.

In instances where data, such as training data, is determined to contain unsatisfactory training data (e.g., based on an identification of stationarity or exceeding a zero-value data threshold), a reselection flag can be triggered, set, or designated. A reselection flag generally provides an indication to reselect a model to perform anomaly detection if an anomaly is detected using the initial model. A reselection flag can indicate that if anomalies are detected during an analysis of the time series data using a selected model, a new model is to be selected (e.g., reselect a model to analyze the time series data). In this way, instead of performing re-estimation (e.g., after identifying an anomaly in the data) of the data using the same model (trained using unsatisfactory training data), a newly selected model can be used to perform anomaly detection resulting in more accurate anomaly detection. In some embodiments, the reselection flag can be stored along with the trained models. In other embodiments, identifying an anomaly in the data can trigger the analysis of the data for unsatisfactory training data.

Model selection engine 208 is generally configured to select a model, such as a predictive model or machine learned model. A model can be selected to analyze data (e.g., time series data obtained), for example, to detect anomalies. By way of example only, the model selection engine 208 can select a model to analyze obtained data (e.g., time series data), such as data obtained by retrieving data directly from a server that stores collected time series data, receiving it as one or more data files, receiving it from a database, or receiving it as raw data, among other methods.

As described, in embodiments, the model selection engine 208 can select an initial model for analyzing time series data, for example, to detect anomalies. In some configurations, the model can be a model for time series forecasting that is characterized based on three dimensions: error, trend, and seasonality. Model dimensions can be based on, for example, Hyndman's library with a STS function. Error, trend, and seasonality can be varied to create a set of models that can be used for analyzing time series data. For instance, each of error, trend, and seasonality can be one of "additive," "none," or "multiplicative." In embodiments, the set of models can comprise five different models with different types of error, trend, and seasonality: ANA, AAA, MNM, AAN, and MNA. An ANA model can use a combination of additive error, no trend, and additive seasonality. An AAA model can use a combination of additive error, additive trend, and additive seasonality. A MNM model can use a combination of multiplicative error, no trend, and multiplicative seasonality. An AAN model can use a combination of use additive error, additive trend, and no seasonality. A MNA model can use a combination of multiplicative error, no trend, and additive seasonality. Each model in the set of models can be trained using training data from the time series data to optimize parameters of the models (e.g., where optimizing the parameters creates a model that accurately predicts values based on the training data). Upon training the models, the model that best represents the time series data can be selected based on error in the model (e.g., based on differences between observed values and predicted value). In particular, the suitability of each of the five models can be determined by determining a Mean Absolute Percent Error ("MAPE") score for each model. The MAPE score can be used to measure accuracy of predictions across a model based on time series data. The model with the best (e.g., lowest) MAPE score can be selected as the model that best represents the data (has the minimal differences between observed values and predicted value). Selecting the model with minimal differences between observed values and predicted value can be used to accurately predict anomalies in the time series data (e.g., based on an observed values deviating from an expected range of a predicted value).

In embodiments, the model selection engine 208, or other component, can use the selected model to detect anomalies data, such as time series data, (e.g., a point outside the confidence intervals). In this regard, input data can be input into the selected model to predict a subsequent or predicted data point(s). As previously described, input data may include time series data. For example, input data may be a second portion of a time series data set that is not used for training the selected model. Such a model can be applied with confidence intervals (e.g., a predefined range of deviation from a predicted data point). Anomalous data can be detected in any number of ways. As one example, when an observed or actual data point (e.g., data point from the time series data) is outside of confidence intervals (e.g., predetermined or designated confidence intervals) of predicted data point, the data point can be designated as an anomaly.

In some instances, when an anomaly is detected in the time series data, re-estimation can be performed. Re-estimation can be performed, for example, when an analysis of data using a selected model indicates the presence of an anomaly(s) but there is no indication of unsatisfactory training data. Re-estimation can adjust the data used to train the selected model by removing known outliers before retraining the model. For instance, re-estimation can include taking into account known customer and/or business cycles (e.g., holidays). Re-estimation can be performed using, for example, the selected model. In other instances, when an anomaly is detected in the time series data, the anomaly(s) can be presented (e.g., using a visualization) as further discussed with reference to visualization engine 212.

Model reselection engine 210 is generally configured to reselect a model, that is select a new or different model. In accordance with embodiments described herein, model reselection can be performed to analyze obtained data (e.g., time series data obtained by data check engine) when the data has been flagged for reselection (e.g., using a reselection flag). As described, in an embodiment, data can be flagged for model reselection when training data (e.g., of a time series data set) is determined to contain unsatisfactory training data. In some instances, unsatisfactory training data can be indicated by stationarity of the time series data. In further instances, unsatisfactory training data can be indicated by a predefined percentage of zeroes occurring in the training portion of the time series data (e.g., 10% of the data comprising the training portion).

Generally, reselection can be triggered or initiated when an anomaly is detected in the time series data, as described above. In this regard, when a data set is flagged as containing unsatisfactory training data and an anomaly is detected, model re-selection can be performed. On the other hand, when a data set is not flagged as containing unsatisfactory training data, and an anomaly is detected, re-estimation can be performed (e.g., as discussed with reference to model selection engine 208).

In some configurations, model reselection, or selection of a new or different model can occur from a set of models. Model reselection can be performed, for instance, when an analysis of data using a selected model indicates the presence of an anomaly and there is an indication of unsatisfactory training data. The models from which to perform reselection may be any number or type of models. In some instances, the set of models can comprise three models from the five models used in the initial selection: ANA, AAA, and AAN. For example, the three models can be the three additive models. Additive models can better handle training data containing zeros than multiplicative models. In other instances, the set of models can comprise the five different models used in the initial selection: ANA, AAA, MNM, AAN, and MNA. The suitability of the models during reselection can be determined by generating a Mean Absolute Error ("MAE") score for each model. The model with the best (e.g., lowest) MAE score can be selected as the new model to use for analyzing the data. Using the three additive models during reselection can be advantageous because a high number of reselections can be performed that increase the accuracy of predicted anomalies in statistically significant manner while maintaining computational efficiency of the anomaly analysis system in providing results (e.g., to users). For example, performing reselection using the three models allows results to be generated using a reselected model, and presented to a user, without a noticeable visual delay (e.g., results presented in real-time or near real-time). As an illustrative example, such reselection can be performed using the three models in a manner that increases accuracy in 42% of requests with only a computational increase in ~9%.

In some configurations, the set of models can be trained using a training portion of the time series data. Model parameters can be estimated, for example, using Hyndman's library with a STS function. Upon training the set of models, a model can be selected as the new model to use for analyzing the data based on the model with the lowest MAE score. The MAE score can indicate the accuracy of predictions by a model (e.g., based on differences between an observed value and its predicted value using the model).

The reselected model can then be used to identify anomalies in the time series data. The reselected model can be applied to the input data to predict data points using the model. The predicted data points determined using the reselected model can be applied with confidence intervals. The confidence interval can indicate a predefined range of deviation from a predicted data point. When an observed point (e.g., data point from the time series data) is outside of the confidence intervals, the point can be designated as an anomaly. In this way, the model reselection engine can use the reselected model to detect anomalies in time series data (e.g., a point outside the confidence intervals). In some instances, when an anomaly is detected in the time series data, re-estimation can be performed using the reselected model. In other instances, when an anomaly is detected in the time series data, the anomalies can be presented (e.g., using a visualization) as further discussed with reference to visualization engine 212

Visualization engine 212 can be used to present data analysis. For instance, in embodiments, anomalies can be presented (e.g., using a visualization). As an example, detected anomalies can be presented in a table. Such a table can provide information, such as, for instance, the exact time point(s) of detected anomalies in the time series data. As another example, detected anomalies can be presented in graph form (e.g., the line of the graph depicting the points of the time series data). In such a graph, upper/lower bounds of the confidence interval can be depicted. In embodiments, anomaly points on the graph (e.g., points that fall outside of the confidence interval) can be identified. Anomaly points can be visually indicated in any number of ways. In instances, an anomaly point can be identified using, for example, an emphasized data point. An emphasized data point can be depicted as a red dot, a bolded dot, or any other manner of emphasis (e.g., other colors, circles, etc.).

Figure 3:
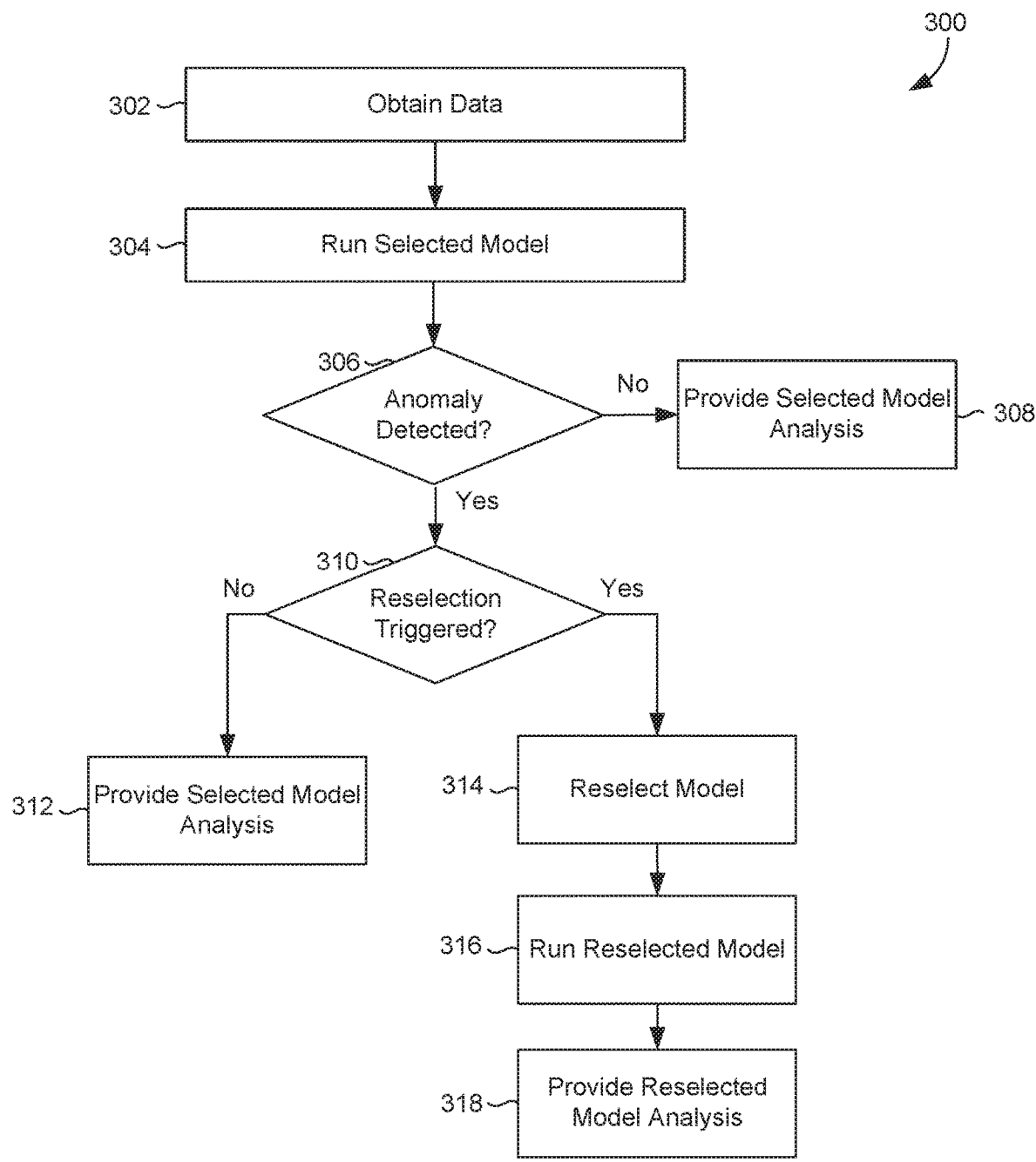
FIG. 3 provides a process flow showing an embodiment of method 300 for selecting a best estimating model for analyzing data capable of efficiently handling the problem of unsatisfactory training data, in accordance with embodiments of the present disclosure.

Turning now to FIG. 3, a process flow shows an embodiment of method 300 for selecting a best estimating model for analyzing data capable of efficiently handling the problem of unsatisfactory training data, in accordance with embodiments of the present disclosure. Method 300 can be performed, for example by anomaly analysis system 204, as illustrated in FIG. 2.

At block 302, data can be obtained. Data can be obtained based on an indication from a user (e.g., a request for performing anomaly detection on a defined time series data set). In an embodiment, the data can be retrieved from a data store. In other embodiments, the data can be retrieved from a server that stores collected time series data.

At block 304, a selected model can be run. In embodiments, a model can be selected from a set of models (e.g., ANA, AAA, AAN, MNM, and MNA) using a lowest MAPE score. Running the selected model can analyze obtained data (e.g., input data). For instance, the selected model can be trained using a training portion of the obtained data. The trained selected model can then be used to analyze an input portion of the obtained data to generated predictions based on the input data. Such a model can be applied with confidence intervals (e.g., indicating the range of confidence related to predictions).

At block 306, a determination can be made as to whether an anomaly is detected. An anomaly can be detected when an observed point does not correspond to predictions by the selected model. For instance, predictions from the selected model can be applied with a confidence interval (e.g., a predefined range of deviation from a predicted data point). When an observed data point (e.g., a data point from obtained data) falls outside of the confidence intervals, the observed data point can be designated as an anomaly. As an example, when a model trained using obtained time series data predicts a next point as five with a confidence interval is plus or minus one (e.g., in relation to a predicted point), the confidence interval for the predicted point can be four to six. If an observed point is actually eight, outside of the four to six confidence interval, then the observed point can be designated as an anomaly. In other words, the actual observed point (e.g., at eight) is an outlier in relation to the predicted points using the time series data (e.g., the range of four to six).

When no anomaly is detected at block 306, the process can proceed to block 308 where a selected model analysis can be provided (e.g., an analysis of the time series data using the selected model). Such an analysis can be provided using, for example, a visualization of the data (e.g., a table or graph). When an anomaly is detected at block 306, the process can proceed to block 310, where a determination can be made whether reselection is triggered.

In instances, reselection can be triggered at block 310 when data (e.g., data obtained at block 302) is determined to contain unsatisfactory training data. In some instances, unsatisfactory training data can be indicated by stationarity of obtained data. In further instances, unsatisfactory training data can be indicated by a predefined percentage of zeroes occurring in the training portion of the obtained data (e.g., 10% of the data comprising the training portion).

When reselection is not triggered at block 310, the analysis by the selected model can be provided at block 312 (e.g., an analysis of the time series data using the selected model). Such an analysis can be provided using, for example, a visualization of the data (e.g., a table or graph). In some instances, prior to providing the analysis, when an anomaly is detected in the obtained data (e.g., at block 306), re-estimation can be performed. Re-estimation can include, for example, taking into account known customer and/or business cycles (e.g., holidays). Re-estimation can be performed using, for example, the selected model.

When reselection is triggered at block 310, model reselection can be performed at block 314. In some configurations, the model can be reselected from a set of models. In some instances, the set of models can comprise the three additive models from the five models used in the initial selection (e.g., ANA, AAA, and AAN). The suitability of the models during reselection can be determined by generating a MAE score for each model. The model with the best (e.g., lowest) MAE score can be selected as the new model to use for analyzing the data. MAPE scores can be vulnerable to outliers in data, as such, MAE scores that are less sensitive to outliers can be used during model reselection. To select the new model during reselection, the set of model can be trained using a training portion of the obtained data. The set of model can then be used to analyze to make predictions from another portion of the obtained data. Error can be based on the differences between an observed value and its predicted value.

At block 316, the reselected model can be run using the input data. Running the reselected model can analyze the obtained data to identify any anomalies in the data. The reselected model can be used to analyze input data of the obtained data to make predictions. Such a reselected model can be applied with confidence intervals (e.g., indicating the range of confidence related to predictions). Anomalies in the obtained data can be identified when an observed data point is outside of a predefined range of deviation from a predicted data point. For instance, when an observed point (e.g., a data point from obtained data) is outside of the confidence intervals, the point can be designated as an anomaly. In some instances, if an anomaly is detected in the obtained data, re-estimation can be performed. Re-estimation can include, for example, taking into account known customer and/or business cycles (e.g., holidays). Re-estimation can be performed using, for example, the reselected model.

At block 318, the analysis for anomalies by the reselected model can be provided. Such an analysis can be provided using a visualization of the data (e.g., a table or graph). For example, detected anomalies can be presented in graph form (e.g., the line of the graph depicting the points of the time series data). In such a graph, upper/lower bounds of the confidence interval can be depicted. In embodiments, anomaly points on the graph (e.g., points that fall outside of the confidence interval) can be identified. As another example, detected anomalies can be presented in a table. Such a table can provide information, such as, for instance, exact time point(s) of detected anomalies in obtained data.

Figure 4:
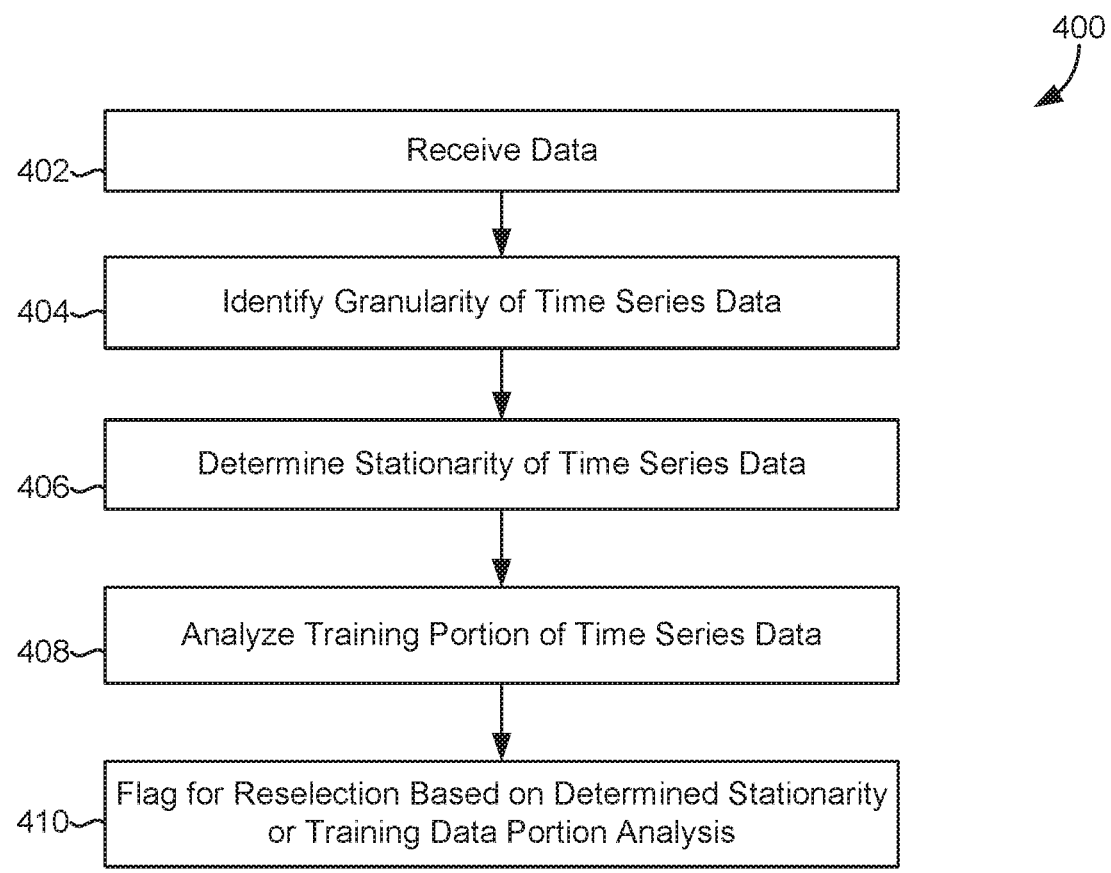
FIG. 4 provides a process flow showing an embodiment for flagging data for reselection, in accordance with embodiments of the present disclosure.

Turning now to FIG. 4, a process flow shows an embodiment of method 400 for flagging data for reselection, in accordance with embodiments of the present disclosure. Method 400 can be performed, for example by the data check engine 206 of the anomaly analysis system 204, as illustrated in FIG. 2.

At block 402, data can be received. Such data can include time series data and a desired granularity level at which to analyze the data (e.g., monthly, weekly, daily, hourly). The data can also indicate a desired confidence interval for results. In an embodiment, the data can be retrieved from a data store. In other embodiments, the data can be retrieved from a server that stores collected time series data.

At block 404, granularity of the time series data can be identified. Granularity can indicate a level at which data is to be analyzed. For instance, granularity can be used to characterize the scale of analysis applied to time series data. As an example, granularity can be monthly, weekly, daily, and/or hourly. Granularity can be used to determine what type of model to select to analyze the time series data. In particular, when the granularity of the time series data is daily or hourly, the models of the anomaly analysis system can be used to detect anomalies in the time data series.

At block 406, stationarity of time series data can be determined to identify unsatisfactory training data. Determining stationarity can be performed using, for example, ADF to determine how strongly a time series is defined by a trend. Results of ADF can be evaluated using p-values from the test. For instance, a p-value below a predefined threshold (e.g., 5%, 10%, etc.) can suggest that the null hypothesis is rejected (i.e., indicating the time series is stationary). On the other hand, a p-value above the predefined threshold can suggest that the null hypothesis is not rejected (i.e., indicating the time series is not stationary).

At block 408, a training portion of time series data can be analyzed to identify unsatisfactory training data. The training portion can be used to train a model for prediction that can then be applied to an input portion of the time series data to predict next points in the series. The training portion of the data can be analyzed to determine a percentage of zero values. Data points with a zero value can indicate a lack of an event. As such, in some instances, when zero values comprise a certain percentage of training data, there is likely not enough information to accurately train a model for predictions.

At block 410, data can be flagged for reselection. Data can be flagged for reselection based on the determined stationarity and/or training data portion analysis. In embodiments, data can be flagged when the data is determined to contain unsatisfactory training data. In some instances, unsatisfactory training data can be indicated by stationarity of the time series data. In further instances, unsatisfactory training data can be indicated by a predefined percentage of zeroes occurring in the training portion of the time series data (e.g., 10% of the data comprising the training portion). In still further instances, unsatisfactory training data can be indicated by both stationarity and a predefined percentage of zeroes. Other methods may be employed to determine or identify unsatisfactory training data, and the examples provided herein are not intended to limit the scope of embodiments described herein. A reselection flag can indicate that if anomalies are detected during an analysis of the time series data using a selected model, instead of performing re-estimation of the data using the same model, a new model can be selected (e.g., reselect a model to analyze the time series data).

Figure 5:
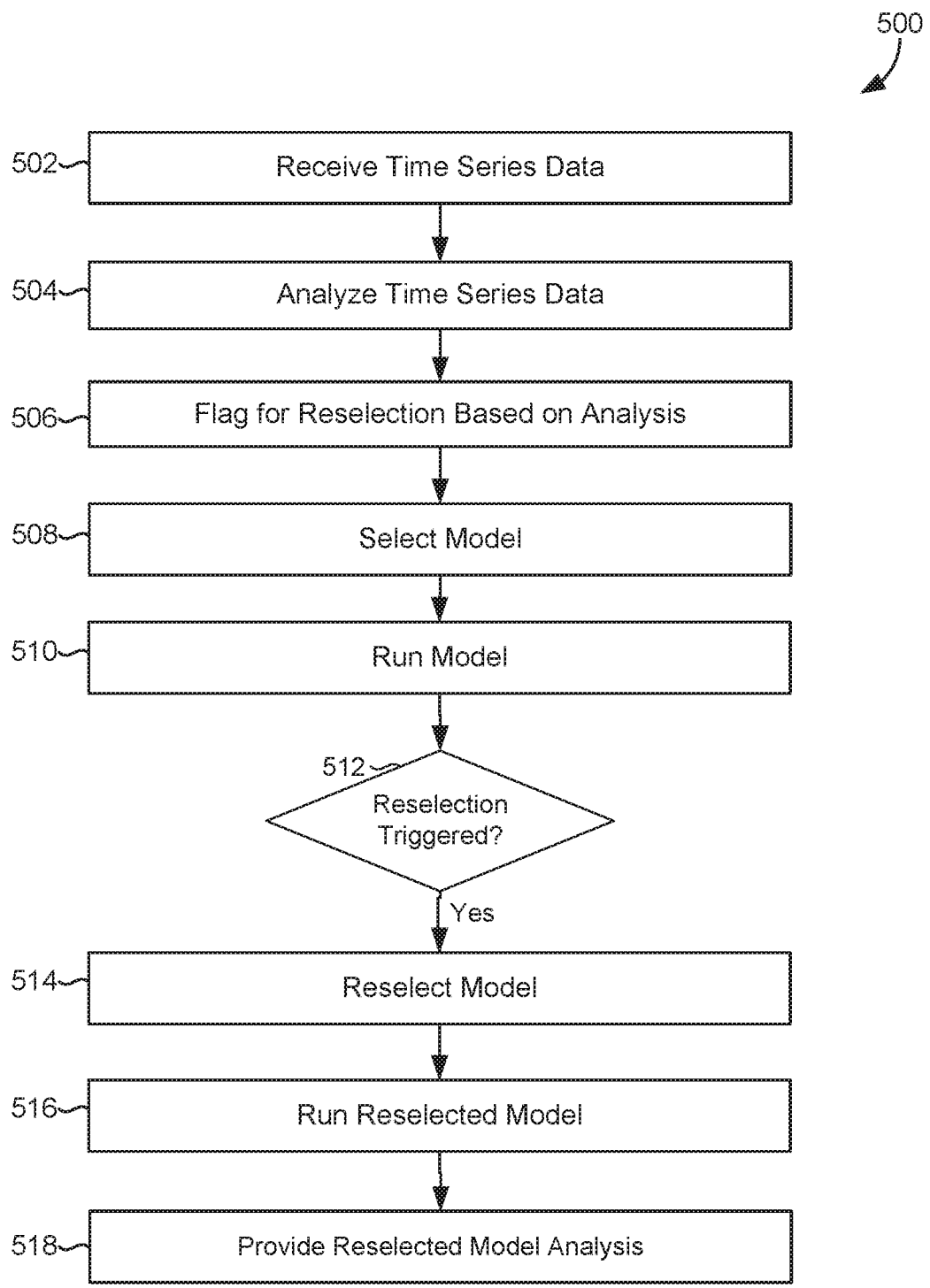
FIG. 5 provides a process flow showing an embodiment for reselecting a model capable of better modeling data to more accurately identify data anomalies, in accordance with embodiments of the present disclosure.

FIG. 5 provides a process flow showing an embodiment of method 500 for reselecting a model capable of better modeling data to more accurately identify data anomalies, in accordance with embodiments of the present disclosure. Method 500 can be performed, for example by anomaly analysis system 204, as illustrated in FIG. 2.

At block 502, time series data can be received. Data can be obtained based on an indication from a user. For instance, a request for performing anomaly detection on a defined data set. In an embodiment, the data can be retrieved from data store 202. In other embodiments, the data can be retrieved from a server that stores a collected time series data. Time series data can generally refer to a sequence of data taken at successive points in time. For instance, a sequence of data indicative of user interactions with a website and/or webpage. Such data can include not just the time series data, but also a desired granularity level at which to analyze the data (e.g., monthly, weekly, daily, hourly) and a desired confidence interval for results.

At block 504, the time series data can be analyzed. For instance, the time series data can be analyzed to determine if the data contains unsatisfactory training data. In some instances, unsatisfactory training data can be indicated by stationarity of the time series data (e.g., indicating the time series fails to follow a consistent trend). Additionally or alternatively, unsatisfactory training data can be indicated by a predefined percentage of zeroes occurring in the training portion of the time series data (e.g., 10% of the data comprising the training portion).

At block 506, data can be flagged for reselection based on the analysis. In instances where data is determined to contain the unsatisfactory training data, a reselection flag can be triggered (e.g., assigned to the time series data). A reselection flag can indicate that if anomalies are detected during an analysis of the time series data using a selected model, instead of performing re-estimation of the data using the same model, a new model will be selected (e.g., reselect a model to analyze the time series data).

At block 508, a model can be selected. In some configurations, the model can be selected from a set of models. The set of models can comprise five different models: ANA, AAA, MNM, AAN, and MNA. The suitability of each of the five models can be determined by generating a MAPE score for each model. The model with the best (e.g., lowest) MAPE score can be selected as the model that best represents the data.

At block 510, the selected model can be run. Running the selected model can analyze input time series data. For instance, the selected model can be trained using a training portion of the time series data. The trained selected model can then be used to analyze another portion of the time series data to predict next points in the series. Such a model can be applied with confidence intervals (e.g., indicating the range of confidence related to predicted points in the series).

At block 512, a determination can be made as to whether reselection is triggered. In an embodiment, reselection can be triggered when an anomaly is detected and the data is flagged for reselection (e.g., flagged at block 506 based on stationarity of the time series data and/or a predefined percentage of zeroes occurring in the training portion of the time series data). An anomaly can be detected when an observed point does not correspond to a prediction by the selected model. For instance, when an observed point (e.g., data point from the time series data) is outside of confidence intervals for a predicted point, the observed point can be designated as an anomaly. Such an actual observed point outside of the confidence intervals can be designated as an outlier in relation to the normal trend predicted using the time series data.

At block 514, when reselection is triggered, a model reselection can be performed. In some configurations, a model can be reselected from a set of models. In some instances, the set of models can comprise the three additive models from the five models used in the initial selection (e.g., ANA, AAA, and AAN). In other instances, the set of models can comprise the five different models used in the initial selection (e.g., ANA, AAA, MNM, AAN, and MNA). The suitability of the models during reselection can be determined by generating a MAE score for each model. The model with the best (e.g., lowest) MAE score can be selected as the new model to use for analyzing the data.

At block 516, the reselected model can be run. Running the reselected model can analyze time series data. For instance, the reselected model can be trained using a training portion of the time series data. The trained reselected model can then be used to analyze another portion of the time series data to predict next points in the series. Such a reselected model can be applied with confidence intervals (e.g., indicating the range of confidence related to predicted points in the series). The reselected model can also be used to identify anomalies in the time series data. For instance, observed points (e.g., data point from the time series data) outside of the confidence intervals, can be designated as anomalies.

Figure 6A:
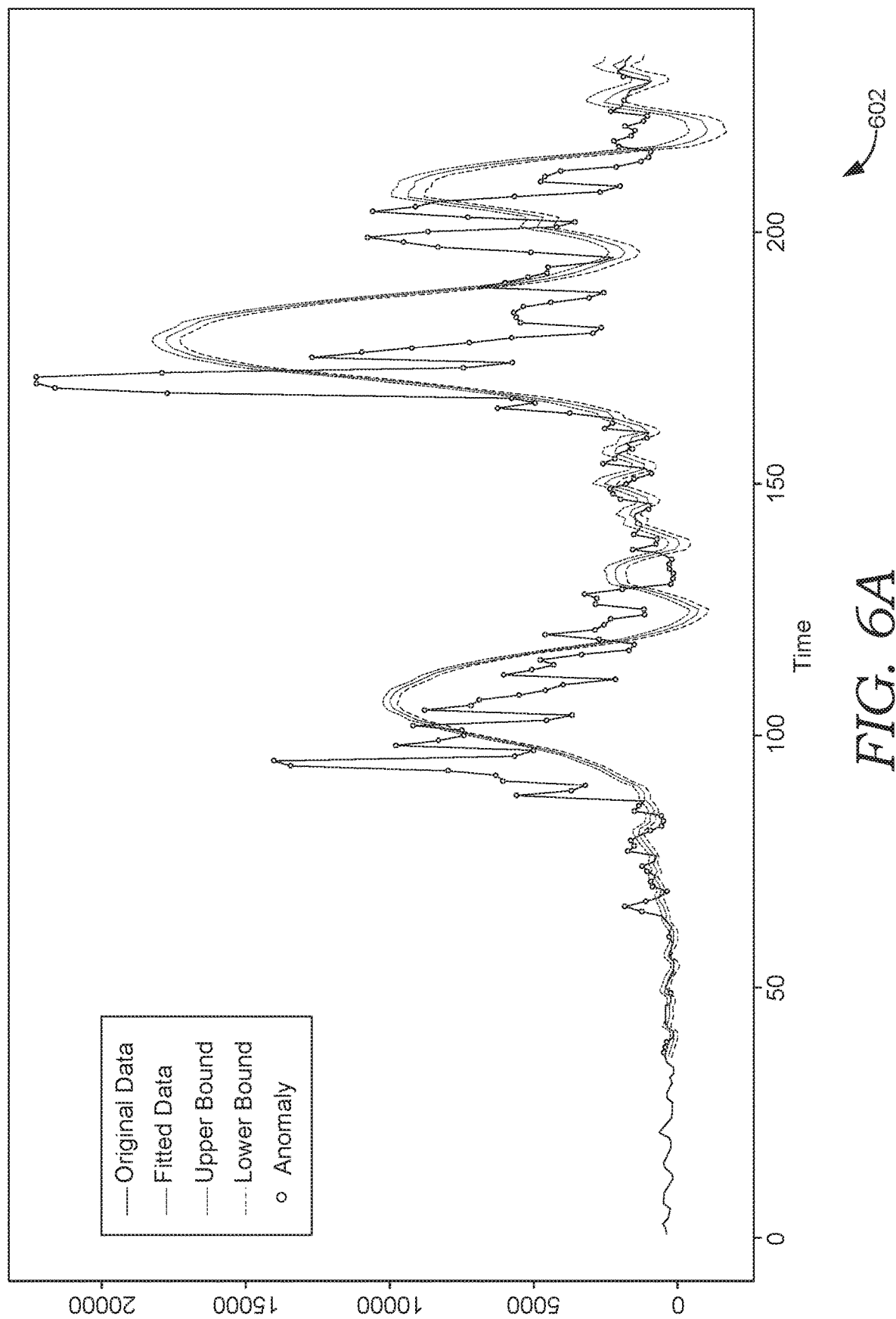
FIG. 6A depicts an illustrative piece of analyzed time series data without model reselection.
Figure 6B:
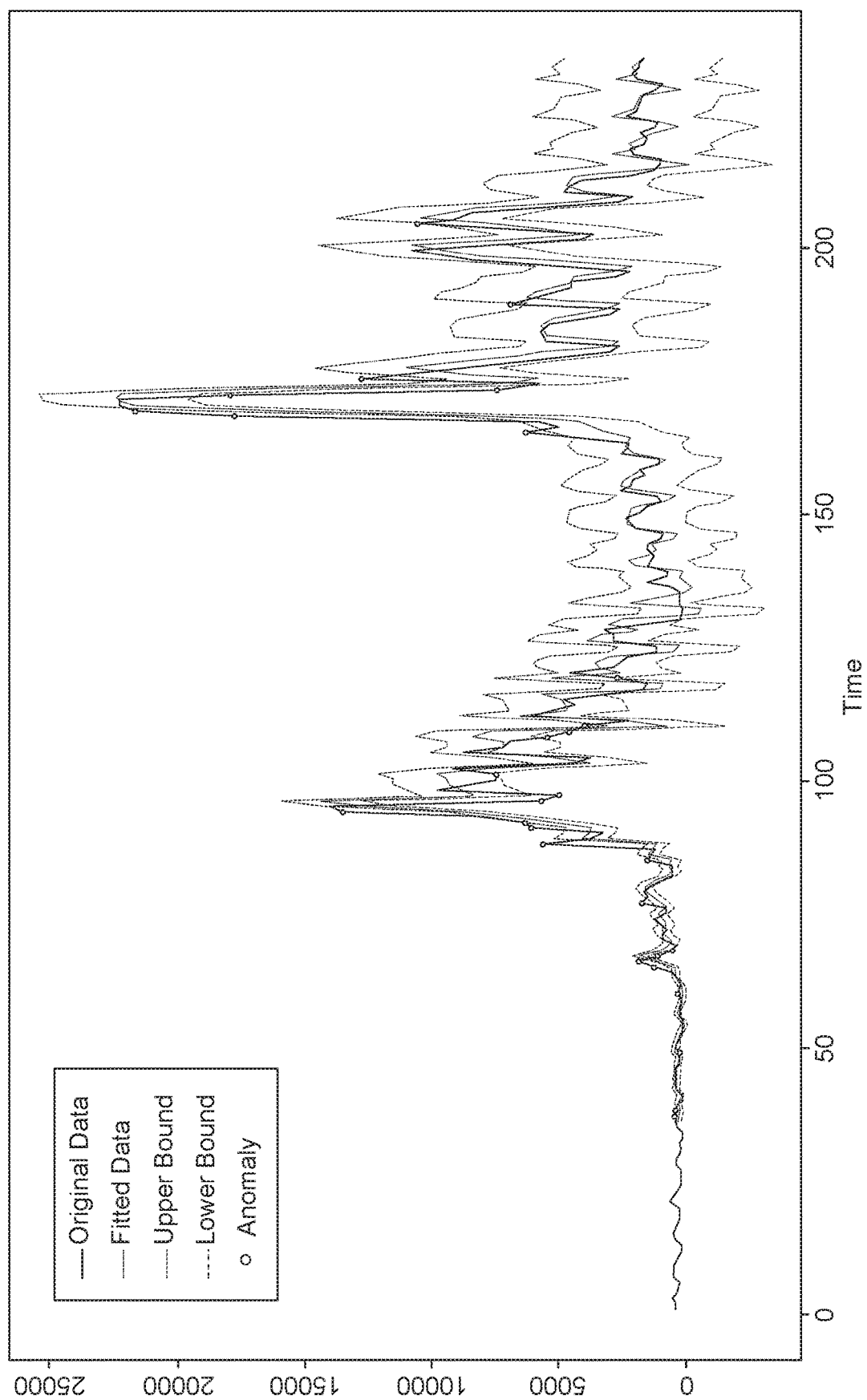
FIG. 6B depicts an illustrative piece of analyzed time series data with model reselection, in accordance with various embodiments of the present disclosure.

At block 518, an analysis from the reselected model can be provided. For example, detected anomalies can be presented in graph form (e.g., the line of the graph depicting the points of the time series data). In such a graph, upper/lower bounds of the confidence interval can be depicted. In embodiments, anomaly points on the graph (e.g., points that fall outside of the confidence interval) can be identified. In instances, an anomaly point can be identified using, for example, an emphasized data point. An emphasized data point can be depicted as a red dot, a bolded dot, or any other manner of emphasis (e.g., other colors, circles, etc.). For instance, in embodiments, anomalies can be presented (e.g., using a visualization). As an example, detected anomalies can be presented in a table. Such a table can provide information, such as, for instance, the exact time point(s) of detected anomalies in the time series data FIG. 6A depicts an illustrative set of analyzed time series data without model reselection. FIG. 6B depicts an illustrative set of analyzed time series data with model reselection, in accordance with various embodiments of the present disclosure. As depicted. FIGS. 6A and 6B utilize the same time series data. FIG. 6B illustrates how model reselection can be used to reselect a model that more accurately identified anomalies in time series data that contains unsatisfactory training data.

Figure 7:
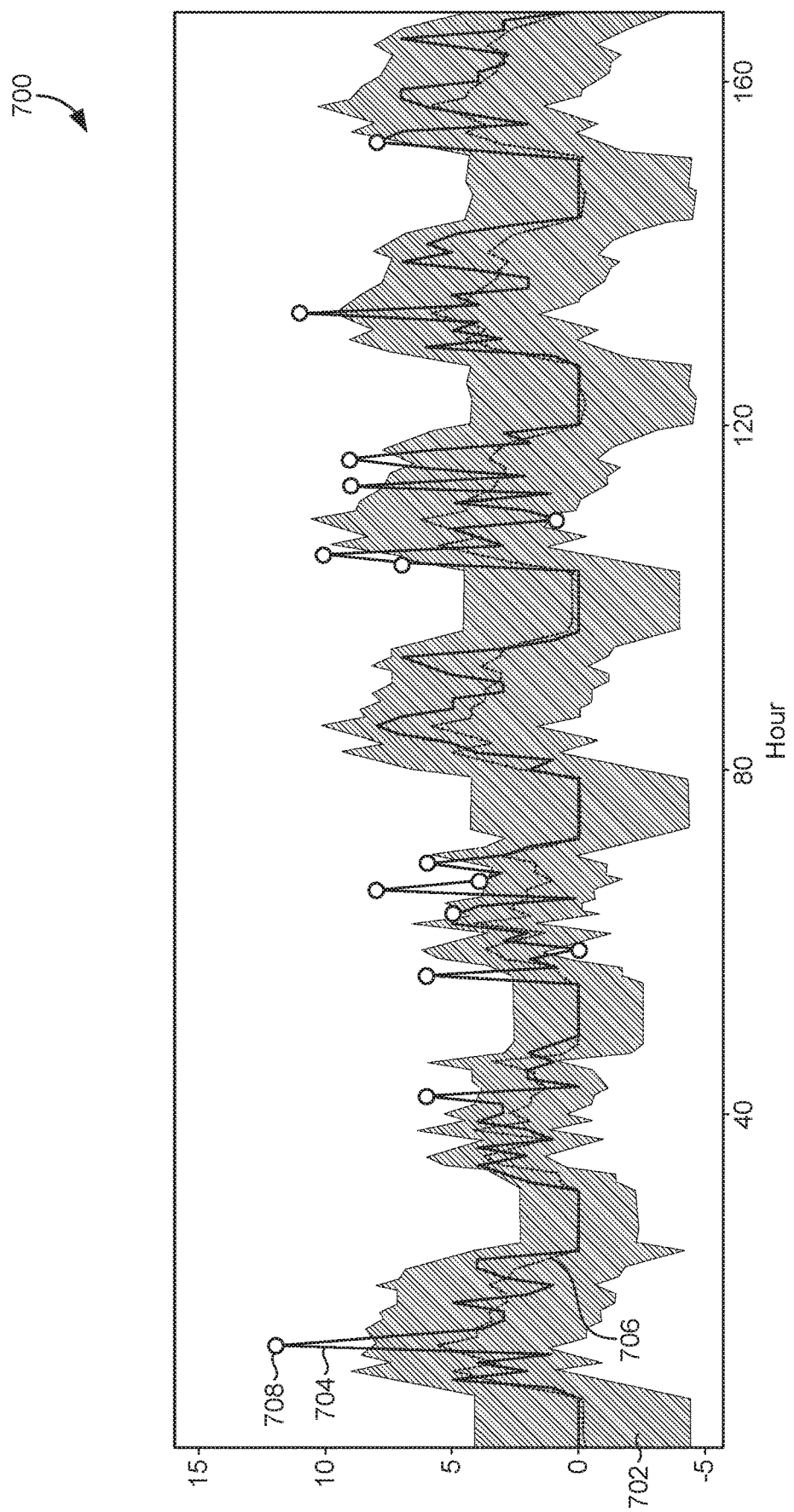
FIG. 7 depicts an illustrative visualization of analyzed time series data, in accordance with various embodiments of the present disclosure.

FIG. 7 depicts an illustrative visualization of analyzed time series data, in accordance with various embodiments of the present disclosure. FIG. 7 provides an example graph for visualizing analyzed time series data and any detected anomalies. Graph 700 depicts a confidence interval 702, time series data 704, fitted data 706, and anomaly 708.

Figure 8:
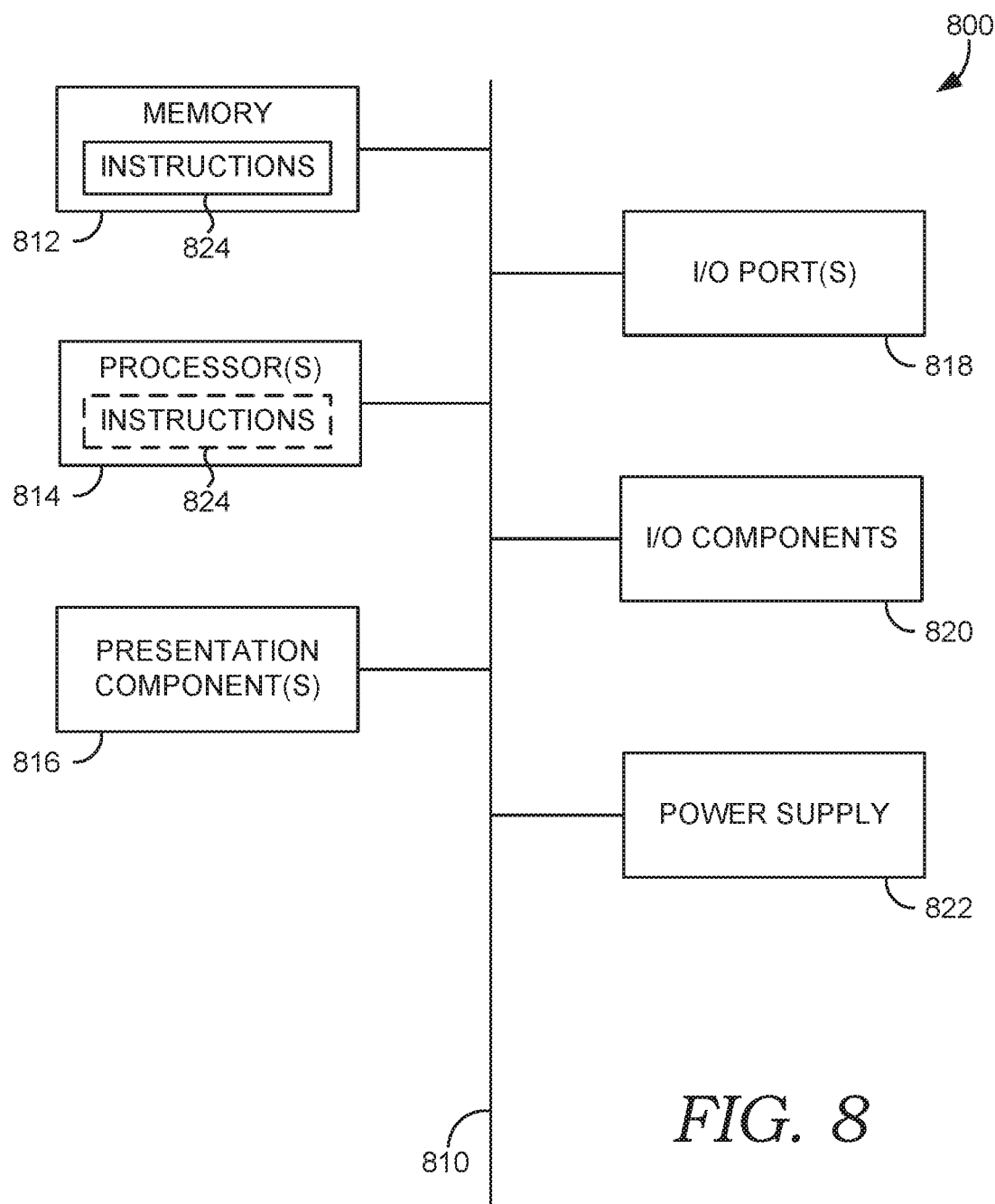
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
    selecting a first predictive model from a set of predictive models including one or more additive models and one or more non-additive models;
    determining that a first set of input data for the first predictive model is associated with a flag for model reselection;
    based on the flag for model reselection, performing model reselection to select a second predictive model to accurately predict data points to detect data anomalies; and
    utilizing the second predictive model to predict data points based on the first set of input data points for use in detecting data anomalies.

2. The computer-implemented method of claim 1, wherein the flag for model reselection is based on a determination that a set of training data includes unsatisfactory training data.

3. The computer-implemented method of claim 2, wherein the determination that the set of training data includes unsatisfactory training data is based on a lack of stationarity.

4. The computer-implemented method of claim 2, wherein the determination that the set of training data includes the unsatisfactory training data is based on a predefined percentage of zeroes occurring in the set of training data.

5. The computer-implemented method of claim 1, wherein performing the model reselection further comprises:
    generating a Mean Absolute Error for one or more models;
    selecting one of the set of predictive models as the second predictive model, wherein the second predictive model is selected based on a lowest Mean Absolute Error value.

6. The computer-implemented method of claim 1, further comprising:
    identifying a first anomaly based on predicted data points using the second predictive model.

7. The computer-implemented method of claim 6, wherein the first anomaly is identified based on a data point being outside of a confidence interval related to a predicted data point corresponding to the data point.

8. The computer-implemented method of claim 1, further comprising:
    generating a visualization based on the second predictive model.

9. The computer-implemented method of claim 1, further comprising:
    identifying a granularity for a set of input data, the set of input data related to a set of training data.

10. One or more non-transitory computer storage media storing computer-useable instructions that, when used by one or more computing devices, cause the one or more computing devices to perform operations comprising:
    identifying a first anomaly in a set of input data based on an analysis of the set of input data using a first predictive model selected for use in predicting data points to detect data anomalies;
    associating a flag for model reselection with a set of training data, used to train the first predictive model, based on unsatisfactory training data to train the first predictive model to accurately identify data anomalies;
    based on the flag for model reselection, performing model reselection to select a second predictive model for use in accurately predicting the data points to detect data anomalies; and
    using the second predictive model with the set of input data to predict the data points for use in detecting the data anomalies.

11. The one or more non-transitory computer storage media of claim 10, the operations further comprising:
    identifying a second anomaly using the second predictive model.

12. The one or more non-transitory computer storage media of claim 11, the operations further comprising:
    generating a visualization based on the second predictive model, the visualization including the second anomaly.

13. The one or more non-transitory computer storage media of claim 11, wherein the second anomaly is identified based on a data point from the set of input data being outside of a confidence interval related to a predicted point corresponding to the data point from the set of input data.

14. The one or more non-transitory computer storage media of claim 10, wherein the training data is unsatisfactory based on a lack of stationarity.

15. The one or more non-transitory computer storage media of claim 10, wherein the training data is unsatisfactory based on a predefined percentage of zeroes occurring in the set of training data.

16. The one or more non-transitory computer storage media of claim 10, the operations further comprising:
    generating a Mean Absolute Error for one or more additive models;
    selecting one of the one or more additive models as the second predictive model, wherein the second predictive model is selected based on a lowest Mean Absolute Error value.

17. The one or more non-transitory computer storage media of claim 10, the operations further comprising:
    determining a granularity for the set of training data and the set of input data.

18. A computing system comprising:

means for flagging training data as unsatisfactory for training a first model, from a set of predictive models including one or more additive models and one or more non-additive models, to identify data anomalies in a set of data; and means for performing model reselection to select a second model to analyze the set of data based on the flagged training data, wherein the second model is selected for accurately predicting data points to detect data anomalies in the set of data.

19. The computing system of claim 18, further comprising:

means for identifying an anomaly in the set of data using the second model.

20. The computing system of claim 18, further comprising:

means for generating a visualization of the data analyzed using the second model.

\* \* \* \* \*